Dec. 24, 1929.  W. D. CORLETT  1,740,971
BALL JOINT
Filed April 19, 1924
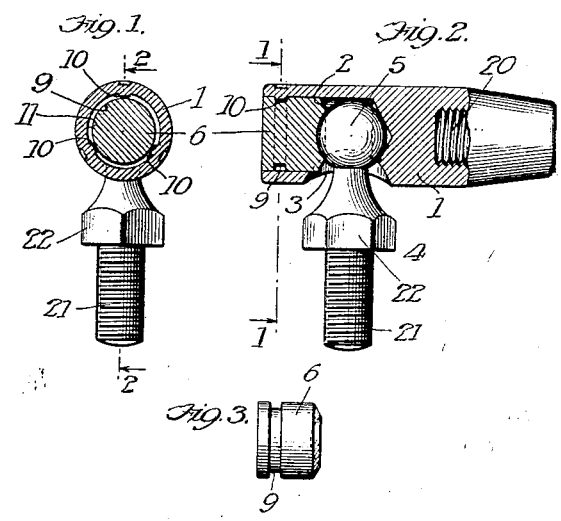
Witness
Martin H. Olsen
Inventor
Webster D. Corlett,
By W. E. Waldo
Atty.

Patented Dec. 24, 1929

1,740,971

UNITED STATES PATENT OFFICE

WEBSTER D. CORLETT, OF OAK PARK, ILLINOIS, ASSIGNOR TO STANDARD SCREW COMPANY, OF JERSEY CITY, NEW JERSEY, A CORPORATION OF NEW JERSEY

BALL JOINT

Application filed April 19, 1924. Serial No. 707,597.

This invention relates to ball joints and relates particularly to ball joints of the type comprising a socket member provided with a hole which opens through the side of the socket therein, and a ball member, the ball of which is adapted to be inserted through the hole in the side of the socket member and is fitted to turn freely in bearings formed therein, comprising a bearing formed in a bearing member fitted to said socket outside of said ball and means for engaging said bearing member with said socket member to confine said bearing member and ball in operative engagement with said socket and a shank on said ball member which projects through the hole in the side of the socket member.

The object of the present invention is to provide a ball joint of the general type specified, which will be simple in construction, inherently strong, efficient in operation and relatively inexpensive to manufacture, as compared with other ball joints of the same type of which I have any knowledge.

To effect the objects of the invention, a ball joint embodying my invention and improvements comprises the various features and details of construction hereinafter described and claimed.

In the accompanying drawings, in which my invention is fully illustrated,

Figure 1 is a sectional end view, on the line 1—1 of Fig. 2, of a ball joint embodying my invention and improvements in preferable form.

Figure 2 is a view thereof, partly in side elevation and partly in section, the line of section being on the line 2—2 of Fig. 1; and Figure 3 is a detached side view of the outer bearing member thereof.

Describing the invention with particular reference to Figs. 1 to 3 of the drawings, 1 designates the socket member of a ball joint of my invention formed in one end of which is the usual socket 2, the wall of which is provided at one side with a hole 3, 4 designates the ball member, the ball 5 of which is adapted to be inserted through the hole 3 into the socket 2 and is fitted to turn freely in bearings formed therein comprising a bearing formed in a bearing member 6 fitted to said socket outside of said ball, and a bearing formed directly in the socket member at the inner end of the socket 2.

In accordance with my present invention, means are provided for engaging the bearing member 6 with the wall of the socket to confine said bearing member and the ball 5 in operative engagement with its bearings in said socket, said means, broadly described, comprising a shoulder formed on the bearing-member and retaining means engaging said shoulder. In what I now consider to be the preferable embodiment of my invention, the means for confining the bearing member 6 in position in the socket 2 consists of a shoulder 9 formed on said bearing member 6 and lugs or projections 10 on the socket member 1, which project into the socket 2 in position to engage the shoulder 9 on said bearing member when the bearing therein is in full designed engagement with the ball 5. Said projections may conveniently be formed by swedging or stamping portions of the socket wall inwardly. As an equivalent construction, my invention contemplates equally swedging or stamping a bead on said socket member, which will confine said ball member 6 in the socket 2, in the manner desired.

In order that the joint may present a finished appearance, the outer end of the bearing member 6 is fitted to the socket 2 and terminates substantially flush with the end of said socket member, the shoulder 9 being formed by the inner side of a groove 11 formed in said bearing member.

With the described construction, it is obvious that the ball 5 having been inserted through the hole 3 into engagement with its bearings, all of said parts will be secured permanently in assembled position by swedging or stamping the lugs or projections 10 inwardly into engagement with the shoulder 9 on said bearing member.

I claim:

A ball-joint comprising a hollow cylindrical socket-member and a ball-member, said socket-member being provided with a hole in one side to receive the ball of said ball-member and an interior ball-engaging thrust-member at one side of the ball retaining the ball in said socket-member, said thrust-member having an unobstructed surface longitudinally fitted into said cylindrical socket-member to enable said member to be properly positioned against the ball, means being provided for permanently locking said thrust-member in its adjusted position against movement either inwardly or outwardly, said means consisting of an annular groove in the exterior cylindrical surface of said thrust-member and integral projections on the inner wall of said socket-member interlocked with said groove.

In witness that I claim the foregoing as my invention, I affix my signature this 8th day of April, 1924.

WEBSTER D. CORLETT.